United States Patent [19]

Campbell

[11] 4,129,217

[45] Dec. 12, 1978

[54] PORTABLE SPRAY PAINTING STATION

[76] Inventor: Talmage D. Campbell, 706 E. Silver Springs Blvd., Ocala, Fla. 32670

[21] Appl. No.: 842,990

[22] Filed: Oct. 17, 1977

[51] Int. Cl.² .......................... A47F 5/08; F16B 45/00

[52] U.S. Cl. ...................................... 211/95; 248/304; 269/46; 211/180

[58] Field of Search .................................. 211/95-101, 211/113-119, 120, 125, 163, 165, 168, 180; 248/215, 303, 304, 339, 340, 341, 288-290; 118/300, 320, 326, 500, 502, 503, DIG. 7

[56] References Cited

U.S. PATENT DOCUMENTS

| | | | |
|---|---|---|---|
| 1,522,873 | 1/1925 | Doering | 211/99 |
| 1,567,269 | 12/1925 | Hoya | 269/46 |
| 1,995,980 | 3/1935 | Haymond | 211/99 |
| 3,062,180 | 11/1962 | Toulmin, Jr. | 118/320 |
| 3,199,820 | 8/1965 | Thompson | 248/304 |

FOREIGN PATENT DOCUMENTS

| | | | |
|---|---|---|---|
| 182901 | 4/1907 | Fed. Rep. of Germany | 269/46 X |
| 343397 | 11/1921 | Fed. Rep. of Germany | 248/304 X |

*Primary Examiner*—James T. McCall

*Assistant Examiner*—Terrell P. Lewis

*Attorney, Agent, or Firm*—Charles E. Brown

[57] ABSTRACT

An apparatus for providing a portable station in which an article may be suspended and coated. The article may remain within the apparatus for drying, or be removed to another location. The apparatus includes a support base capable of being suspended from a generally vertical surface, a beam connected to and extended generally longitudinally horizontally from the support base, at least two first hangers are rotatably depended from the beam and the first hangers are also positioned in spaced relationship relative to each other and from the support base. The apparatus may also suitably include a second hanger for each first hanger. Each second hanger is suspended from each respective first hanger, and is engagably detachable therefrom. The apparatus further includes a drop curtain which is suspended from the generally horizontal beam. The drop curtain collects any stray droppings or spray mist which occur during the coating application of the article. The drop curtain is engagably detachable from the beam, and may be removed for storage purposes.

6 Claims, 8 Drawing Figures

FIG.4
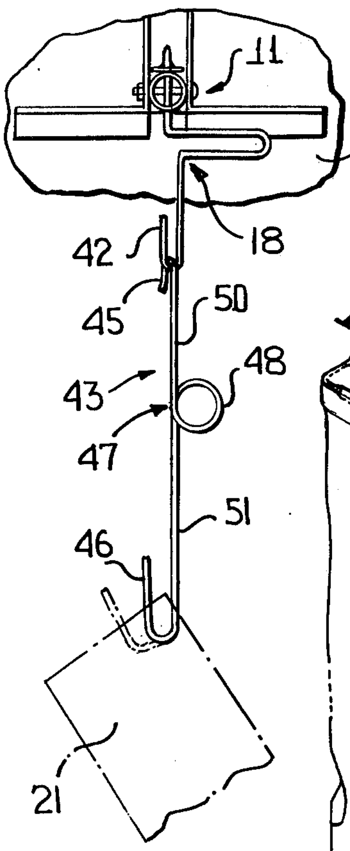
FIG.5
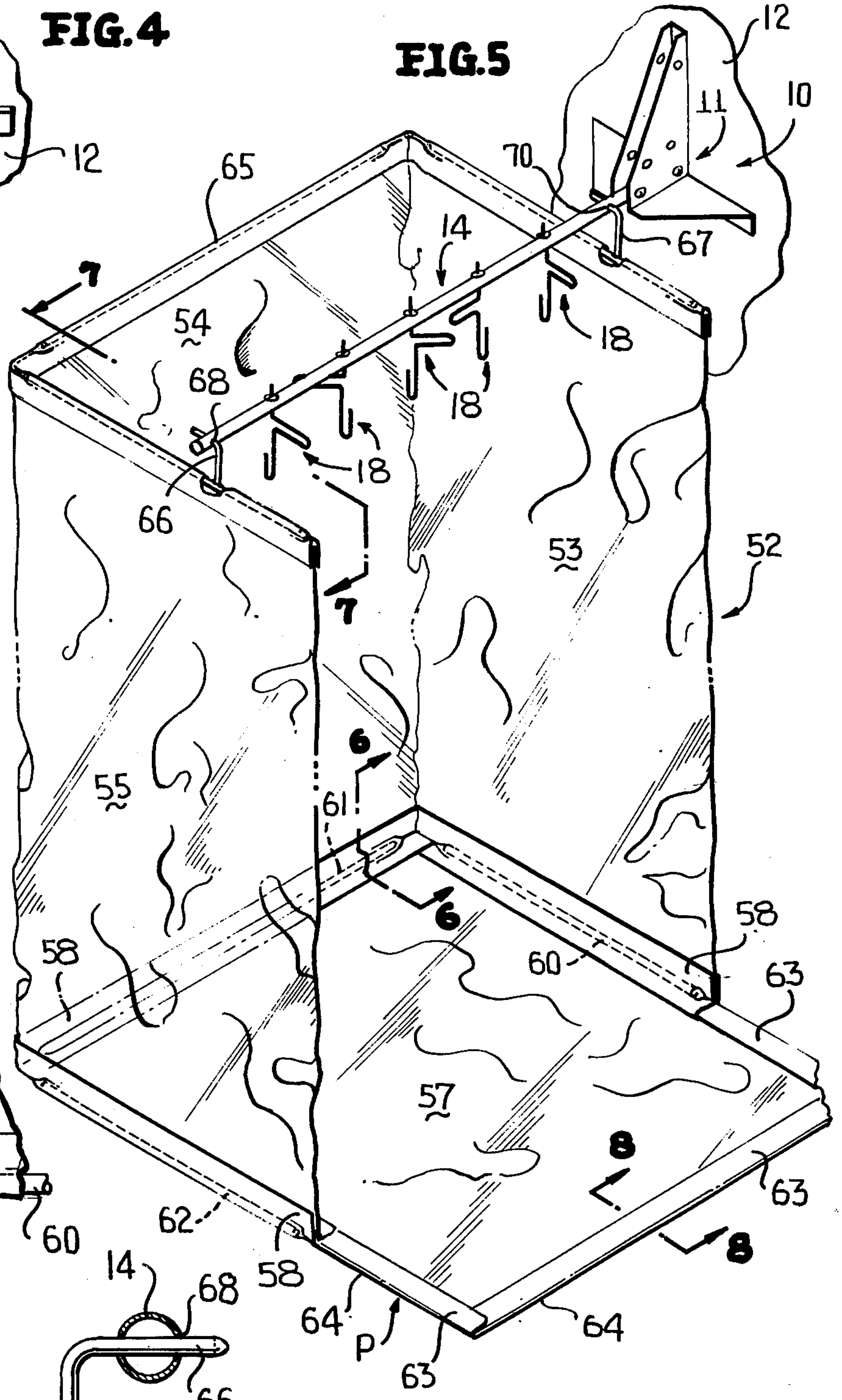
FIG.6
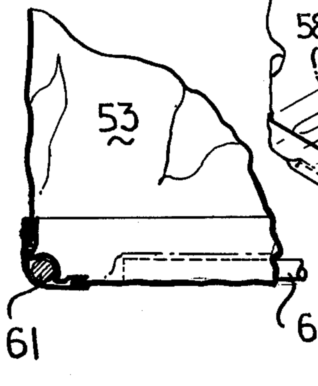
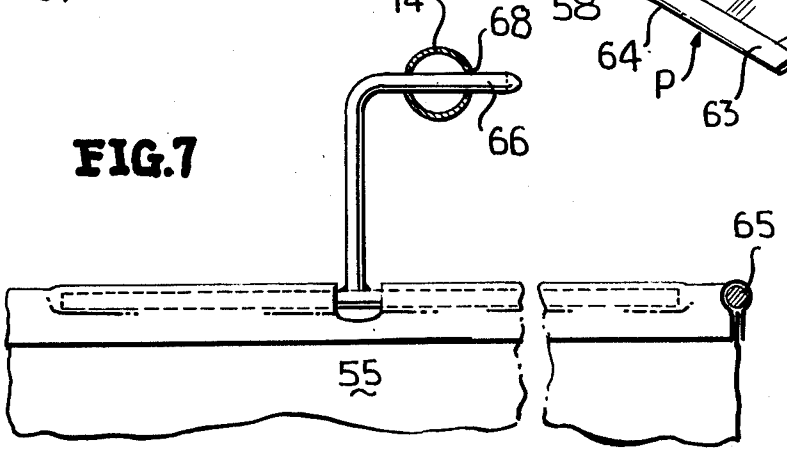
FIG.7
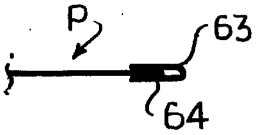
FIG.8

PORTABLE SPRAY PAINTING STATION

At one time or another, most of us have found it necessary to perform the job of spray painting articles within our own households. As a hobbyist or an individual periodically attempting odd jobs on one's own, we have found several disadvantages associated with the painting of one or several articles.

First, we have had to locate an area of the house where we could paint an article without creating a mess. Usually, the basement or garage is selected as a suitable area where the article is to be painted. Unfortunately, not all individuals have the benefit of a basement or garage area, particularly with the construction of houses which are built on concrete slabs.

Another disadvantage of spraying an article is the mess associated with having to section an area of the house off so that no indication of painting will remain. Usually one lays out several layers of newspaper or other suitable protective means over the area within which the article is to be painted. Even with the surface area being adequately covered, it has been found that when using spray painting cans there is a mist or overspray associated therewith which reaches areas lying directly adjacent the protected area. The result is spray paint overspray or shadow which remains upon unprotected areas in the immediate vicinity, usually the wall or nearby furnishings.

Still another disadvantage associated with the painting of an article is the necessity of positioning the article in such a way that the article may be completely coated without any unnecessary overlapping of coats. Depending upon the actual configuration of the article to be coated, the individual may lay the article upon a suitable support, such as a bench, paint one side of the article and then turn the article over to paint the opposite side thereof. Often, the individual may also employ a hook or suitable wire to suspend the article from a nearby location directly above the covered area. This usually entails finding a proper location from which the article may be suspended, and seeking an old piece of wire or coat hanger and a pair of pliers with which the wire may be shaped to provide a hook. Still one is limited by the size and weight of the article to be suspended, and often one can only suspend small and light weight articles from the shaped wire. Once the article has been suspended from the shaped wire, another difficulty arises in that the article must be uniformly coated. One faces the difficulty of maneuvering around the article to apply the paint.

It is an objective of this invention to provide an apparatus which will overcome the disadvantages associated with the painting of an article. The apparatus provides a portable station which may be conveniently set up within any location which provides adequate support, such as a wall. The apparatus is compact and provides suitable means for suspending an article therefrom. The apparatus also has the capability of allowing an individual to freely rotate the article to be coated in a 360° arc so that even and uniform coats may be applied to the article. A suitable drop cloth, which is engagably detachable from the apparatus, is employed to catch any overspray and eliminate any mess resulting from the painting application of the article. The drop cloth is constructed to provide a secluded area covering three sides of a box-like shaped configuration and the immediate floor area.

A further object of this invention is to provide a handle means which enables an individual to freely rotate an article while applying a coat of paint without actually contacting the article. The handle means also serves as an indicator feature which is desirable especially when several items are being painted, and it is necessary to apply paint evenly and without waste. Several items can be suspended from the apparatus and paint methodically applied to coat one side at a time and in succession. By observing the positioning of the handle means, one can visually tell where one coat leaves off and another coat starts. This is particularly helpful when applying a second coat, and it is particularly difficult to determine the difference between the old and the new coat.

With the above, and other objects in view that will hereinafter appear, the nature of the invention will be more clearly understood by reference to the following detailed description, the appended claims and the several views illustrated in the accompanying drawings.

IN THE DRAWINGS

FIG. 4 is a side sectional view of a second hanger element engagably depending from the first hanger element of the apparatus.

FIG. 5 is a side plan view, and specifically illustrates a drop cloth which is detachably retained by the apparatus of FIG. 1.

FIG. 6 is an enlarged fragmentary view of a portion of the drop curtain taken along line 6—6 of FIG. 5, and more specifically illustrates the construction of the drop curtain and support relative thereto.

FIG. 7 is an enlarged fragmentary view of the drop curtain suspended from the apparatus and is taken along line 7—7 of FIG. 5, and more specifically illustrates the element which engagably suspends the curtain from the apparatus.

FIG. 8 is an enlarged fragmentary view of the crop curtain taken along line 8—8 of FIG. 5, and more specifically illustrates the particular construction of the curtain thereat.

Figure 1:
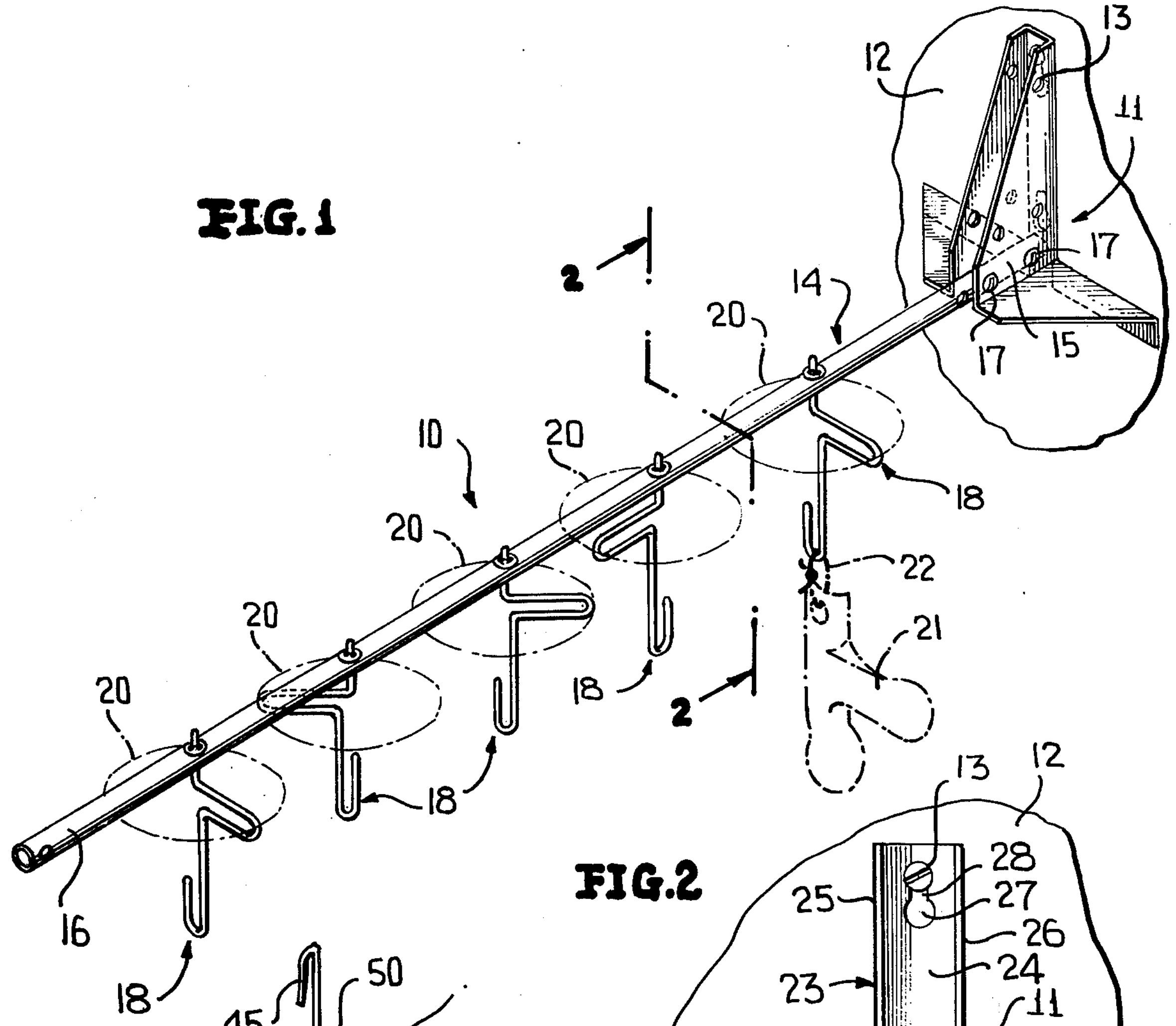
FIG. 1 is a side longitudinal view of the apparatus and more specifically illustrates the 360° arc through which the first hanger means may be rotated.

A novel apparatus for providing a temporary station, where an article may be coated with paint, is generally designated by the numeral 10. The apparatus 10 includes a support base 11 which is capable of being suspended from a generally vertical support surface 12. The support surface 12 may be any convenient wall or mounting area upon which the support base 11 may be suspended therefrom. The support surface 12 may also be a tree or a pole from which the support base 11 may be suspended.

A suitable retaining element 13 may be employed to suspend the support bracket 11 relative to the support surface 12. The retaining element 13 may be a screw or a nail which is retained by the support surface 12 and engagably received by the support bracket 11 thereby depending the apparatus 10 from the support surface 12. The retaining element 13, although not specifically illustrated, may be in the form of a piece of wire utilized to be retained by the support base 11 and engagably secured around a support surface 12, when the support surface 12 is in the form of a tree or pole.

The apparatus 10 includes a generally longitudinal pole or beam 14 which extends generally horizontally from the support bracket 11. The beam 14 is generally cylindrical in shape, although not particularly limited to this particular structural shape. The beam 14 has opposing terminal ends 15 and 16. The terminal end 15 is securely retained to the support base 11 by screws or bolts 17.

The apparatus 10 includes a plurality of first hangers 18 which are rotatably depended from the beam 14. Each first hanger 18 is positioned in a spaced relationship with respect to another first hanger 18 and the support surface 12. Each first hanger 18 is capable of being rotatably moved through a generally 360° arc, which is generally designated by the reference numeral 20. Each first hanger 18 is structured to support an article 21 therefrom. The article 21 which has been generally outlined is detachably secured to a respective first hanger 18 by a piece of wire or string 22.

Figure 2:
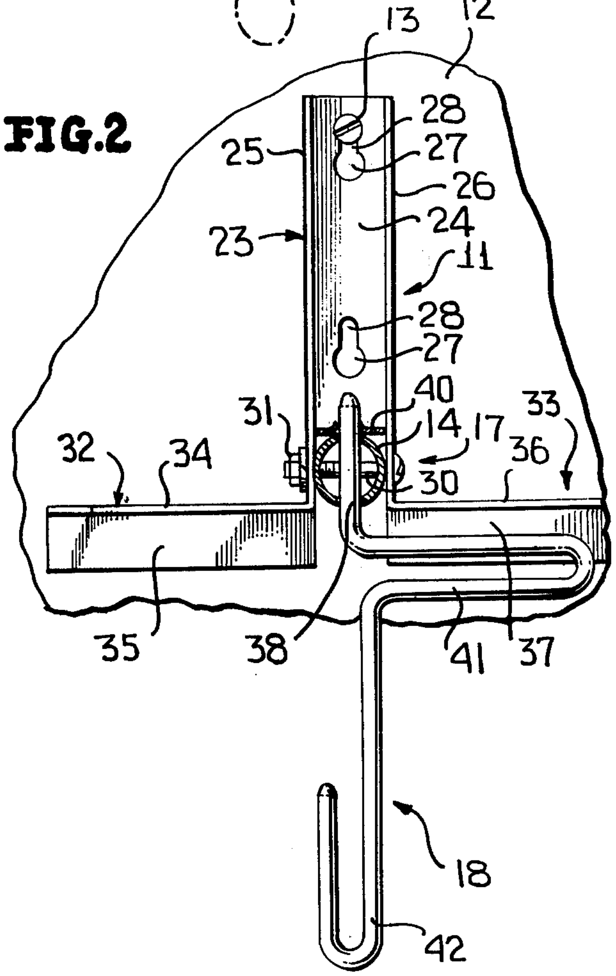
FIG. 2 is an enlarged fragmentary side view taken along line 2—2 of FIG. 1, and more specifically illustrates the particular construction of the support base.

Referring now to FIG. 2 of the drawings, the structural configuration of the support base 11 and the structural configuration of the first hanger 18 will be herein discussed in more detail. The support base 11 is shown securely mounted by retaining element 13, in the form of a screw, to the support surface 12. The support base 11 includes a plurality of sections. A first section 23 is a generally vertical upright channel having a broad portion 24 and respective depending flange portions 25 and 26 which provide structural support to the portion 24. The portion 24 has a plurality of generally circular openings 27 which are shaped to conveniently receive respective retaining means 13 therein. The portion 24 also includes an elongated slot 28 depending from each respective circular opening 27. Each elongated slot 28 has a dimention which is slightly smaller than the diameter of the circular opening 27.

When temporarily mounting the apparatus 10 upon the support surface 12, the circular opening 27 of the support base 11 freely receives the retaining means 13 which has been secured to the support surface 12. The support base 11 is allowed to freely slide upon the support surface 12 while the retaining means 13 is received within the elongated slot 28 and temporarily retains the support base 11 to the support surface 12.

The flaps 25 and 26 are positioned a distance apart which is sufficient to allow the beam 14 to be received therebetween. The beam 14 is secured to the first portion 23 of the support base 11 by the bolt assemblies 17. The bolt assemblies 17 include a body portion 30 which is threaded, and a nut portion 31 which is threaded to be engagably received by the body portion 30. The nut portion 31 may be in the form of a lock nut which is commercially available, or may be a nut and lock washer combination.

The support base 11 further includes respective second and third sections 32 and 33. Each respective second and third sections 32 and 33 perpendicularly depend from the first section 23 and are positioned generally horizontally with respect to the first section 23. The second section 32 has a generally angular configuration and includes an edge 34 which buttingly engages with the edge 25 of the first section 23 to form a generally angular configuration therewith. The second section 32 also includes a flat portion 35 depending generally perpendicular with respect to the edge 34, is aligned generally parallel in relation to the flat panel 24, so that when the support base 11 rests against the support surface 12, the flat portion 35 also rests against the support surface 12 and provides distribution of any force encountered when an article 21 is suspended from the apparatus 10.

The third section 33 is of an angular configuration similar to that of the second section 32 and includes an edge 36 which depends generally perpendicular with respect to the edge 26 of the first section 23 to form a generally angular configuration therewith. The third section 33 also includes a flat portion 37 depending from the edge 36. The flat portion 37 is positioned generally parallel with respect to flat portions 24 and 35 respectively, and when the support base 11 is mounted upon the support surface 12, the flat portion 37 serves to provide stabilizing support to the support base 11.

Referring to the first hanger 18, as illustrated by FIG. 2 of the drawings, particular attention is directed to the actual configuration of the first hanger 18 which enables free rotation thereof resulting in the enabling of the application of the uniform coats upon an article by rotation thereof. The first hanger 18 is constructed from a rod-like material and is rotatably depended from the beam 14. The first hanger 18 is also constructed of a plurality of sections. A first section or terminal end 38 is suitably constructed to be vertically inserted and depend from an opening (not specifically illustrated) within the beam 14. A retaining ring or clip 40 is engagably slid over a portion of the first terminal end 38 whereby the first hanger 18 is rotatably retained to the beam 14. The first hanger 18 further includes a second section or handle 41 which is connected to the first terminal end 38. The handle 41 is in the form of a generally elongated shaped U, and is connected to the first terminal end 38 and depends generally perpendicular therefrom. The handle 41 serves to enable an individual to freely rotate the first hanger 18 through a 360° arc by being rotatably pivoted with respect to the first terminal end 38.

The first hanger 18 includes a third section or second terminal end 42 which is connected to the handle 41 and depends generally vertical therefrom. The second terminal end 42 is in the form of an elongated hook and is constructed to detachably retain an article which may be suspended therefrom.

Although the clip 40, illustrated in FIG. 2 of the drawings, retains the first terminal end 38 of the first hanger 18 to the beam 14, it should be noted that the retaining clip 40 may be removed and a portion of the first terminal end 38 may be flattened, and thereby enable the first hanger 18 to be pivotably retained to the beam 14. The flattening of the first terminal end 38 will in no way hinder the rotating capability of the first hanger 18 with respect to the beam 14.

Figure 3:
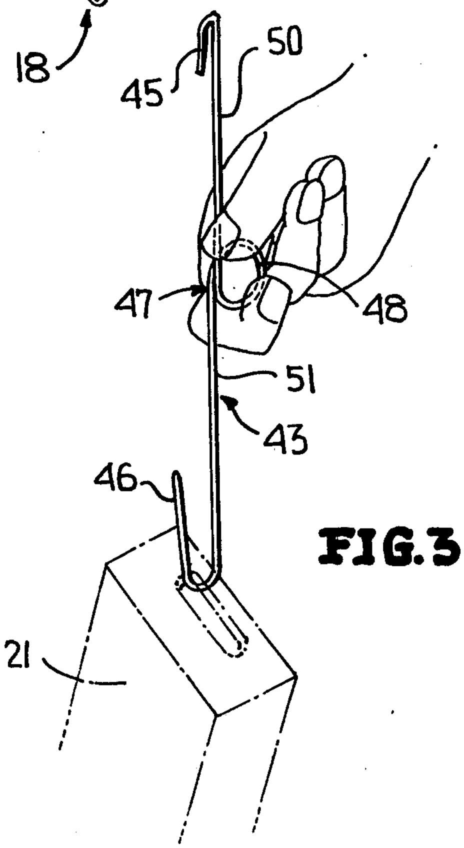
FIG. 3 is a view of a second hanger element from which an article may be suspended, and specifically illustrates the portion by which an individual may securely handle the second hanger element.

Referring to FIGS. 3 and 4 of the drawings, a second hanger 43 is shown, and may be used in combination with the apparatus 10 to suspend an article 21 therefrom. It seems that quite often when one gets involved in painting articles around the house there is not always sufficient space to allow a number of articles to be coated and remain in that location while drying. Therefore, the second hanger 43, as illustrated in FIG. 4 of the drawings, is employed to engagably depend from the first hanger 18 of the apparatus 10 while retaining an article 21 therefrom. After having coated the article 21, which is suspended from a second hanger 43 which can be placed in an area different from that where the apparatus 10 has been temporarily set up. This enables the user to coat several articles at one time. The second hagner is constructed to eliminate the usual mess associated with the moving of an article before it is dry.

The second hanger 43 is constructed from rod-like material, and has a plurality of interconnected sections. The second hagner 43 includes two respective end terminals 45 and 46 which are U-shaped in structure. A gripping or handle section 47 in the form of an enclosed circular loop 48 with respective depending vertical sections 50 and 51 is connected between the respective terminal ends 45 and 46. The closed circular loop 48 is suitably constructed to receive a finger and be grasped by supporting fingers of an individual's hand whereby the second hanger assembly 43 and a corresponding article 21 depending therefrom may be attached to or detachably removed from the first hanger 18.

Respective terminal ends 45 and 46 of the second hanger 43 are positioned with the open portions of their U-shaped configuration facing generally towards each other. The terminal ends 45 and 46, furthermore, are positioned generally parallel and vertical with respect to each other having respective arms 50 and 51 vertically disposed therebetween. The terminal end 45 may have a U-shaped configuration of any length desirable, although the only requirement according to the present invention is that the terminal end 45 be of sufficient length to be engagably retained from the second terminal end 42 of the first hanger 18. This is necessary in order that an article suspended from the apparatus 10, will not readily disengage itself without being manually removed therefrom. The second terminal end 46 of the second hanger 43 may also be of any suitable length relative to the U-shaped configuration. It may be deemed necessary to make some second terminal ends 46 longer than others in order that various argicles 21 having different depths and areas may respectively be retained thereby.

The second terminal end 46 is further constructed from material which is readily bendable. The bending ability of the second terminal end 46 permits the user to spread and close the open portion of the U-shaped configuration thereof, and permits various articles 21 having different size openings to be suspended therefrom. The bending ability of the second terminal end 46 is illustrated by the phantom hook area in FIG. 4 of the drawings.

Referring to FIGS. 5 through 8 of the drawings, the apparatus 10 is shown in another embodiment, employing a drop curtain in the form of a cubicle or chamber 52. The drop curtain 52 is constructed of three interconnected panels 53, 54 and 55 which collectively define a U-shaped structure. The drop curtain 52 further includes a bottom panel 57 which is secured by a piece of tape 58 to the respective panels 53, 54, and 55. The tape 58 may also securely retain securing rods or plates 60, 61 and 62 where the bottom panel 57 is joined to the respective panels 53, 54 and 55. Although not particularly limited to this arrangement, the tape 58 and respective supporting rods 60, 61 and 62 may be removed and the forming of the bottom panel 57 with the respective side panels 53, 54 and 55 may be formed by any conventional means which would also provide supporting strength to the drop curtain 52.

The bottom panel 57 is constructed so that it will substantially meet the dimensional opening of the U-shaped drop curtain 52 and also includes an extended portion P which extends beyond the U-shaped configuration. In order that the extended portion P of the bottom panel 57 exhibits rigidity, several sections of tape 63 overlap an exterior edge 64.

In order that the drop curtain 52 be properly positioned with respect to the apparatus 10 to collect any overspray associated with the coating of an article depending from the apparatus 10, a supporting hanging structure 65 is secured to the respective side panels 53, 54 and 55 at a point adjacent the U-shaped opening opposite the bottom panel 57. The supporting hanger structure 65 includes respective hanging arms 66 and 67 which are connected thereto and positioned in opposed relationship to each other. A respective pair of openings 68 and 70 have been made within the beam 14 for engagably receiving and depending therefrom respective hanging arms 66 and 67.

Although in the present embodiment of the invention, as illustrated specifically in FIG. 5 of the drawings, the respective hanging arms 66 and 67 generally horizontally engage the respective openings 68 and 17, it should be understood that they are not necessarily limited thereto. It should be, furthermore, understood that the respective hanging arms 66 and 67 may be constructed such that they are generally U-shaped, and respective openings 68 and 70 are disposed generally vertically within the beam 15, and that the respective hanging arms 66 and 67 are disposed generally vertically to engage the respective openings 68 and 70.

Although only preferred embodiments of the invention have been specifically illustrated and described herein, it is to be understood that minor variations may be made in the apparatus without departing from the spirit and the scope of the invention, as defined in the appended claims.

I claim:

1. An apparatus for providing a portable station where an article may be suspended or removed therefrom after being coated, said apparatus including a support base capable of being suspended from a generally vertical surface, a beam connected to and extending generally longitudinally horizontally from said support base, at least two first hangers rotatably depended from said beam, said first hangers being positioned in spaced relationship relative to each other and from said support base, a second hanger corresponding to each of said first hangers and being suspended therefrom, each of said second hangers being engagably detachable from a respective said first hanger, each of said first hangers having a plurality of interconnected sections, a first section of said first hanger being a swivel depending vertically from said beam and being pivotally connected thereto, a second section of said first hanger being a handle horizontally depending from said first section of said first hanger, said second section of said first hanger being capable of being rotated thereby moving said first section of said first hanger pivotally relative to said beam, a third section of said first hanger being a hook vertically depending from said second section of said first hanger wherein said third section of said first hanger is suitably arranged to engagably receive said second hanger.

2. The apparatus as defined in claim 1 including a drop curtain suspended from said beam and detachably removable therefrom, said first and second hanger means are disposed within said drop curtain and are capable of being rotated therein, said drop curtain has three interconnected adjacent sides with a bottom panel depending therefrom to form a chamber with an open end through which a coat may be applied to a suspended article.

3. The apparatus as defined in claim 1 wherein each of said second hangers has a plurality of interconnected sections, a first section of said second hanger is a hook being suitably arranged to be engagably received by said third section of said first hanger whereby said second hanger is engagably suspended from said first hanger, a second section of said second hanger is a hook being depended vertically from said first section of said second hanger and suitably arranged to suspend the article to be painted therefrom, each of said second hangers further has a third section disposed and interconnected between said first and second sections of said second hanger, said third section of said second hanger being arranged to provide a handle whereby said second hanger may be engaged and removed relative to said hanger.

4. An apparatus for providing a portable spraying station wherein an article may be coated with paint, said apparatus including a support base capable of being suspended from a generally vertical surface, a beam being connected to and extending generally longitudinally horizontally from said support base, at least two first hangers each being rotatably depended from said beam, said first hangers being positioned in spaced relationship relative to each other and from said support base, said first hangers each having a terminal end for engagably suspending an article therefrom, and handle means being secured to each first hanger for enabling an individual to pivotally rotate each first hanger through a 360° arc wherein each article may be completely coated.

5. The apparatus as defined in claim 4 including a second hanger corresponding to each of said first hangers is suspended therefrom, each second hanger is engagably detachable from said terminal end of each respective first hanger.

6. The apparatus as defined in claim 4 wherein said handle means is constructed to serve as a position indicator thereby allowing for even uniform coating of the article.

* * * * *